United States Patent Office 3,178,190
Patented Apr. 13, 1965

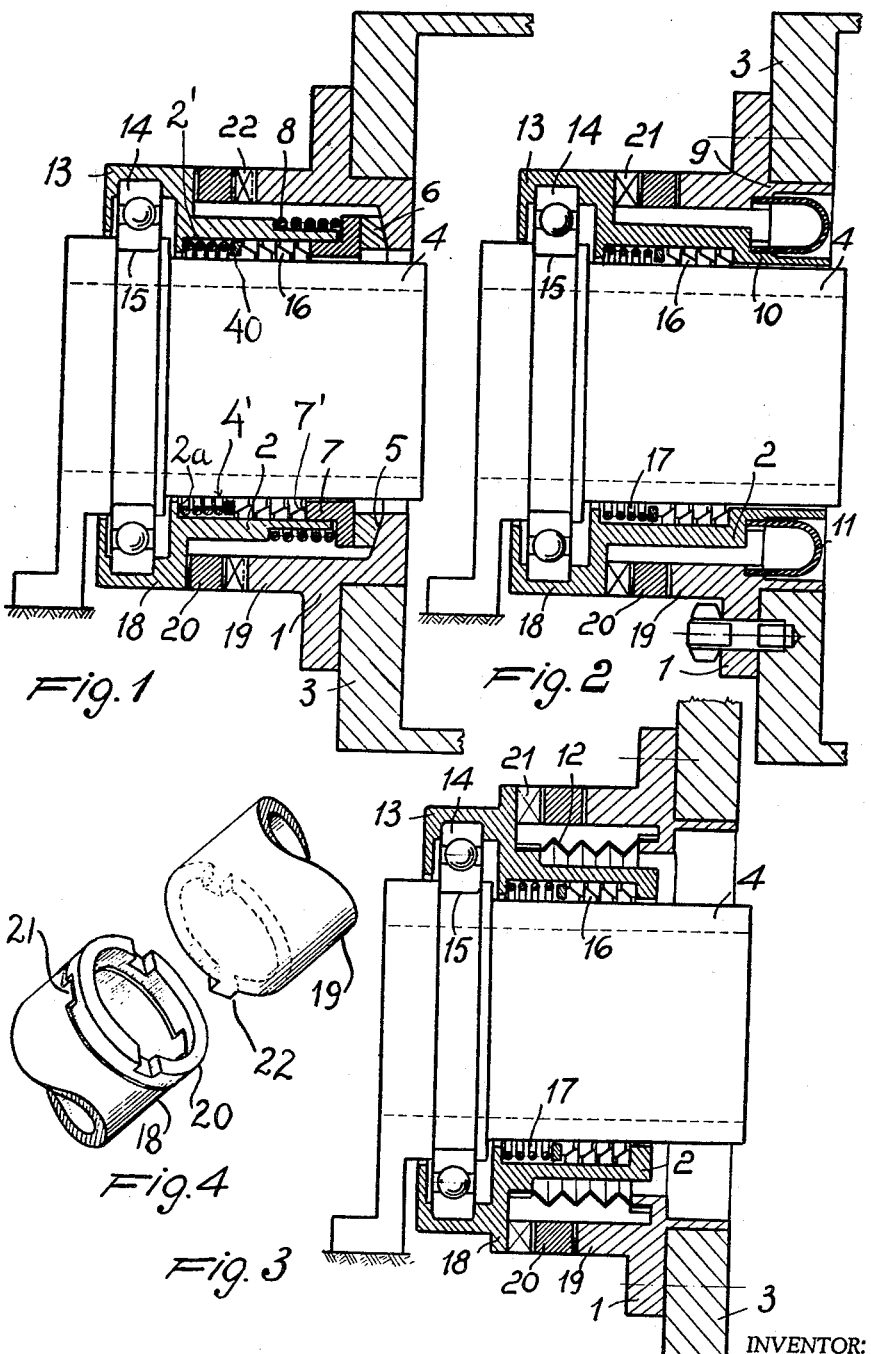

3,178,190
FLUID-TIGHT SEALING DEVICE FOR
ROTATING BODIES
Virgilio Vardanega, Milan, Italy, assignor, by mesne assignments, to Società Edison, Milan, Italy, a corporation of Italy
Filed May 17, 1961, Ser. No. 119,767
Claims priority, application Italy, May 28, 1960, 9,746/60, Patent 632,227
7 Claims. (Cl. 277—8)

This invention relates to a fluid-tight packing device or seal for rotating surfaces performing relative axial and transverse displacement.

It is known that many chemical processes involve the treatment of substances within suitable containers which revolve continuously about a generally horizontal axis. Consequently, not only must the component substances and products be fed and discharged while the vessel is in rotation, but also, since gases or liquids are almost always contained within or are being formed inside said containers and must not be allowed to escape during processing, the devices through which feeding and discharging take place must provide a perfect fluid tight seal in spite of the relative motion.

Numerous devices exist, such as those described as stuffing boxes, mechanical sealing system, gaskets for revolving shafts etc., all of which perform excellently the task of providing a continuous seal between a rotating surface of revolution and a stationary surface or between surfaces rotating at different angular velocities; all of these devices require, however, that the rotary motion occur with great precision about a well-defined and fixed geometric axis.

In those cases, on the other hand, in which the rotary motion cannot be guided by precision mechanisms but is guided by circular rails or runners, always slightly out-of-round and carried in turn by rollers which are also imperfect, the sealing means devices hereinabove mentioned cannot be used because they would be rapidly rendered unserviceable by the fluctuations in position of the axis of rotation of the revolving container.

In such cases, i.e. where the seal must be provided between surfaces of revolution whose axes are not perfectly in line nor fixed in relation to one another, devices with elastic rings are generally employed, the effectiveness of such seals is not always very satisfactory both on account of their abrasive action and on account of the imperfect nature of the seal which must be used together with proper grease or heavy-oil lubrication, the latter being not always compatible with the conditions under which the sealing device has to work.

The object of the present invention is to provide a solution to this type of sealing problem, a solution which will be free from the drawbacks inherent in known fluid-tight sealing means and applicable even where the fluids involved are chemically corrosive and at fairly high temperatures.

More specifically, the present invention aims to provide a device which is capable of affording a complete solution to the problem of sealing in the conditions hereinabove mentioned, especially the particular case of sealing between parts integral with a container rotating on circular runners resting on rollers, and stationary parts belonging to the feeding and discharging devices of said container.

The invention achieves these and other objects, which will become apparent hereinafter, by providing two distinct sealing contrivances combined with each other, one capable of providing a seal between two surfaces of revolution rotating at the same angular speed but about axes which are neither perfectly aligned nor fixed with respect to one another, and another capable of providing a seal between two perfectly coaxial surfaces, one of which is rotating and the other stationary, or both of which are rotating but at different angular speeds.

In particular, the device based on this concept, designed to form a fluid-tight seal or packing between surfaces of revolution of which at least one is part of a first body revolving about a geometrical axis which is not rigorously stable, and at least another one is part of a fixed body or a body rotating at a speed different from that of the aforesaid first body but with an axis which is fixed and tends to coincide with the mean position of the first-named axis, the seal being characterized in that it comprises, in addition to a member integral with the first revolving body and in addition to another fixed or differently rotating body, also some intermediate members arranged coaxially with respect to said other rotating body and so mounted as to be compelled to rotate by the first body; the intermediate members have two counter-surfaces which cooperate: one with the sealing surface provided by the member of the first rotating body and the other with the sealing surface provided by the fixed or differently rotating body, through sealing means suitably interposed and compressed therebetween and forming with said surfaces the aforesaid two distinct sealing contrivances.

The rotary motion imparted to said intermediate members by means of the revolving body can with advantage be imparted through a joint of a type suitable to allow the necessary axial displacement between the driving and the driven parts.

Further advantages and characteristics of the invention will become more readily apparent from the detailed description of some preferred but not exclusive embodiments of the inventive concept, which are illustrated in the accompanying drawing, given purely for illustrative purposes;

In the drawing:
FIG. 1 is an axial cross-sectional view of a first embodiment of the invention.
FIGS. 2 and 3 are similar sections of two other embodiments of the same invention, which differ from the first in some details of construction.
FIG. 4 is a perspective detail view of the coupling means of the invention, drawn to a reduced scale.

Referring now in more detail to these figures, the sealing or packing device comprises a sleeve member 1 affixed to the hollow body or container 3 (shown partially) which is guided by circular rails and rollers, known per se and not illustrated, or by other equivalent means; the device also includes a fixed surface of revolution 4, constituted by a tubular body and forming part of the conduit or other feeding or discharging device of container 3 and so situated as to be partially embraced or surrounded by said member 1. Interposed between members 1 and 4 there is furthermore provided the first annular or sleeve member 2 so guided and connected as to be rotatably driven by the second sleeve member 1 at the same angular velocity but about a geometrical axis which coincides perfectly with that of tubular body 4; this axis is located approximately at the mean position of the axis of container 3. A coupling means or joint 20 is adapted to connect member 1 to member 2 in the aforesaid manner thus permitting in addition a small relative transverse displacement between members 1 and 2 as will hereinafter be explained, whilst guide means 14 in the form of bearings are disposed on member 4 to maintain the first sleeve member 2 substantially coaxial with the tubular body 4, while enabling them to rotate freely in relation to each other. The second sleeve member 1 generally coaxially surrounds an axially extending portion of sleeve member 2.

According to the invention, two annular sealing units are provided, one between member 1 and member 2, which revolve together, adapted to maintain a seal even though there may be continual small displacements between 1 and 2; and a second between member 2 and member 4, which rotate in relation to each other and have fixed coincident axes, adapted to maintain the seal under these conditions.

The above-mentioned annular sealing means can be provided in various ways.

In the embodiment of FIG. 1, the first sealing means (i.e. the sealing means between second sleeve member 1 and first sleeve member 2) has a surface 5 of substantially spherical extension formed on member 1 and having its center on the axis of rotation of member 1; the sealing means also is provided with a planar counter-surface, perpendicular to the aforesaid axis of rotation, these surfaces being bridged by a ring 7, which is co-axial with member 2 and rotates therewith but is free to shift axially in relation thereto, and a ring 6 interposed in the manner of a gasket between member 1 and piece 2. Ring 6 is formed with a planar face which conforms perfectly to the plane face of ring 7, and a spheroidal face which conforms perfectly to spherical surface 5. A spring 8 urges ring 6 in an axial direction and is seated against member 2.

In the system of FIG. 2, on the other hand, the sealing means between member 1 and member 2 consists of the surfaces 9 and 10 which are formed at the end of members 1 and 2 respectively, and a flexible generally toroidal ring 11, made of a suitable elastic material, which is fixed at one end to surface 9 and at the other end to surface 10 while being received within the first annular clearance defined by the sleeve members. This sealing means rotates together with members 1 and 2 and provides a seal between them while still permitting small axial displacements between said members, such displacements being caused by imperfections in the guide means of the revolving container whereon member 1 is fixed.

In the embodiment of FIG. 3, the first sealing means between members 1 and 2 consists of membrane member in the form of an elastic bellows connected at one end to member 1 and at the other to member 2 in such a way as to bring about a seal between these two members.

In its most simplified form, this bellows may be reduced to a tubular member of flexible or elastic material.

The second sealing means, between members 2 and 4, can be provided according to any of the known types.

In FIGS. 1, 2 and 3 there is shown a single embodiment of the second sealing means, consisting of a series of annular gaskets 16 which will be more fully described hereinbelow.

They are contained within a second annular clearance defined by two co-axial cylindrical surfaces 2' and 4' belonging respectively to member 2 and member 4, and by two planar surface 2a or 7' and 40 perpendicular to the common axis of the first two surfaces; one of the gaskets bears on a planar surface of member 2 or member 7, and the other on an axially mobile ring 40 subjected to the action of spring 17.

In the system of FIG. 1, the surface on which gaskets 16 press is assigned to annular member 7 instead of member 2, so that the continuity of the seal between the two members 1 and 2 can be ensured.

The set of gaskets 16 consists of a plurality of pairs of rings, one over-lapping the other with complementarily bevelled surfaces, adapted to cause the gasket rings to contract and expand in a radial direction under the action of an axial thrust.

The connecting joint or coupling means between members 1 and 2 is designed outwardly of the first clearance and can be of any type provided that it is suitable for transmitting rotary motion between members with offset axes.

In the devices shown in FIGS. 1, 2 and 3 an Oldham-type joint is provided and comprises annular portions 18 and 19 integral respectively with members 2 and 1 and with keys 21 and 22, and an intermediate ring 20 provided on its two outer faces with the two splines for keys 21 and 22 which are offset by 90° to each other as shown in FIG. 4.

The guide means which constrain members 2 and 4 in a manner that though free to move in relative rotation, they remain exactly coaxial, are of known type, such as ball or roller bearings, friction bearings or other equivalent means.

In the embodiments illustrated in FIGS. 1, 2 and 3 there is provided a ball bearing 14 with a very reduced play keyed externally onto the annular portion 13 which is integral with member 2 and co-axial with the sealing surface of the latter, and keyed internally onto surface 15 which is integral and co-axial with the sealing surface of member 4.

The invention thus conceived is capable of numerous modifications and variants all lying within the scope of the invention. Thus, for example, the sealing means and the driving mechanisms can be of any type according to differing requirements. Furthermore, all parts may be replaced by technically equivalent means. In practice, the materials employed as well as the dimensions, can be varied without departing from the scope of the present invention as hereinabove described and hereinbelow claimed.

I claim:
1. A seal for two relatively rotatable bodies, including a tubular body and a hollow body having respective generally parallel axes relatively displaceable in a transverse direction, comprising a first annular sleeve member rotatably journaled on the tubular one of said bodies and surrounding both of said axes while extending axially therealong; a second axially extending annular sleeve member connected to the hollow other of said bodies for concurrent rotation therewith, one of said sleeve members generally coaxially surrounding at least a portion of the other sleeve member with an axially extending annular first clearance therebetween; means for maintaining said first member substantially coaxial with said one of said bodies; coupling means outwardly of said clearance interconnecting said first and second members for joint rotation while permitting relative displacement in a direction transverse to their respective axes, said first and second members having spaced confronting surfaces in said first clearance; first annular sealing means disposed in said clearance with freedom of movement in said transverse direction while maintaining a fluid-tight closure between said surfaces, said first member comprising a sleeve portion surrounding said one of said bodies with a second annular clearance; and second annular sealing means disposed in said second clearance for maintaining a fluid-tight connection between said first member and one of said bodies whereby a fluid can pass between said bodies without escaping therefrom at said seal.

2. A seal as defined in claim 1 wherein said surface of said other of said bodies is generally spheroidal, said first mentioned sealing means being provided with a complementary surface bearing upon said spheroidal surface, further comprising spring means bearing upon said first sealing means in axial direction for urging it in the direction of said spheroidal surface of said other body.

3. A seal as defined in claim 1 wherein the first sealing means is a resilient ring of U-shaped configuration whose shanks extend generally parallel to said axes and are connected to respective ones of said surfaces.

4. A seal as defined in claim 1 wherein the first sealing means is a flexible sleeve surrounding said axes and connected to said surfaces at opposite ends of said sleeve.

5. A seal as defined in claim 1 wherein said coupling means is an Oldham joint having two degrees of freedom transverse to said axes.

6. A seal as defined in claim 1 wherein said second sealing means comprises a plurality of axially shiftable stuffing-box packings and spring means bearing axially upon said packings.

7. A seal as defined in claim 1 wherein said second member is formed with an axially extending annular portion surrounding said sleeve portion, said coupling means interconnecting said first member with said annular portion outwardly of said sleeve portion.

References Cited by the Examiner

UNITED STATES PATENTS

| 1,197,593 | 9/16 | Baughan | 277—99 |
| 2,119,244 | 5/38 | Pranger | 277—97 |
| 2,278,074 | 3/42 | Hauf | 277—205 |
| 2,880,678 | 4/59 | Hoffer | 277—93 |

FOREIGN PATENTS

| 209,265 | 1/24 | Great Britain. |

EDWARD V. BENHAM, *Primary Examiner.*

WALTER A. SCHEEL, SAMUEL ROTHBERG,
*Examiners.*